United States Patent
Masuda et al.

(10) Patent No.: US 8,328,430 B2
(45) Date of Patent: Dec. 11, 2012

(54) THRUST ROLLER BEARING

(75) Inventors: Satoshi Masuda, Fujisawa (JP); Hiromichi Takemura, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/993,900

(22) PCT Filed: Jun. 22, 2006

(86) PCT No.: PCT/JP2006/312472
§ 371 (c)(1),
(2), (4) Date: Dec. 26, 2007

(87) PCT Pub. No.: WO2006/137468
PCT Pub. Date: Dec. 28, 2006

(65) Prior Publication Data
US 2009/0123105 A1 May 14, 2009

(30) Foreign Application Priority Data
Jun. 23, 2005 (JP) .................................. 2005-183538

(51) Int. Cl.
*F16C 19/30* (2006.01)
*F16C 23/00* (2006.01)
*F16C 33/58* (2006.01)

(52) U.S. Cl. ......................... 384/618; 384/620; 384/622

(58) Field of Classification Search .................. 384/618, 384/619, 620, 621, 622, 623
See application file for complete search history.

(56) References Cited

FOREIGN PATENT DOCUMENTS

| JP | 1-168016 UM | 11/1989 |
|----|-------------|---------|
| JP | 9-189325 A | 7/1997 |
| JP | 09189325 A * | 7/1997 |
| JP | 2000-266043 A | 9/2000 |
| JP | 2000266043 A * | 9/2000 |
| JP | 2003-049844 A | 2/2003 |
| JP | 2003-083339 A | 3/2003 |
| JP | 2003-254327 A | 9/2003 |

OTHER PUBLICATIONS

Office Action issued in counterpart German Application No. 11 2006 001 700.4-12 dated Jan. 29, 2010.

* cited by examiner

*Primary Examiner* — Phillip A Johnson
(74) *Attorney, Agent, or Firm* — Sughrue Mion, PLLC

(57) ABSTRACT

A thrust roller bearing 10 is provided in which one half of total gap which results from adding up an outer diameter side in-bearing gap 22 and an inner diameter side in-bearing gap 23 in diametrical direction is made larger than the amount of eccentricity between a member 51 which supports an outer ring 11 and a member 53 which supports an inner ring 14. When inside diameter at distal end of an outer locking portion 19 along a distal edge portion of an outer flange 13 is $\phi D1$, outside diameter of a cage 18 is $\phi D2$, outside diameter at a distal end of an inner locking portion 20 along a distal edge portion of an inner flange 16 is $\phi D3$, inside diameter of the cage 18 is $\phi D4$ and thickness of the cage 18 is t, A, B are defined as $A=(D2-D1)/t$ and $B=(D3-D4)/t$, $0.1 \leq A, B \leq 5$ is satisfied.

6 Claims, 9 Drawing Sheets

FIG. 5

| sample no. | eccentricity amount | conventional specification A=1.5, B=1.5 | specification of the invention A=0.75, B=1.0 |
|---|---|---|---|
| (1) | 0.1 | O(discontinued after lapse of 100 hours) | O(discontinued after lapse of 100 hours) |
| (2) | 0.2 | O(discontinued after lapse of 100 hours) | O(discontinued after lapse of 100 hours) |
| (3) | 0.3 | O(discontinued after lapse of 100 hours) | O(discontinued after lapse of 100 hours) |
| (4) | 0.4 | X(25hr) | O(discontinued after lapse of 100 hours) |
| (5) | 0.5 | X(15hr) | O(discontinued after lapse of 100 hours) |
| (6) | 0.6 | X(5hr) | O(discontinued after lapse of 100 hours) |

FIG. 6

| bearing no. | A | strength of cage (○ no chipping / X generation of chipping) | separation difficulty (○ no separation / X generation of separation) |
|---|---|---|---|
| 1 | 0.05 | ○(5/5) | X(1/5) |
| 2 | 0.08 | ○(5/5) | X(4/5) |
| 3 | 0.1 | ○(5/5) | ○(5/5) |
| 4 | 0.5 | ○(5/5) | ○(5/5) |
| 5 | 1 | ○(5/5) | ○(5/5) |
| 6 | 3 | ○(5/5) | ○(5/5) |
| 7 | 5 | ○(5/5) | ○(5/5) |
| 8 | 6 | X(4/5) | ○(5/5) |
| 9 | 10 | X(2/5) | X(not assembled) |
| 10 | 15 | X(0/5) | X(not assembled) |

FIG. 7

| bearing no. | B | strength of cage (O no chipping / X generation of chipping) | separation difficulty (O no separation / X generation of separation) |
|---|---|---|---|
| 1 | 0.04 | O (5/5) | X(0/5) |
| 2 | 0.09 | O (5/5) | X(4/5) |
| 3 | 0.2 | O (5/5) | O (5/5) |
| 4 | 0.8 | O (5/5) | O (5/5) |
| 5 | 2 | O (5/5) | O (5/5) |
| 6 | 3 | O (5/5) | O (5/5) |
| 7 | 4 | O (5/5) | O (5/5) |
| 8 | 7 | X(3/5) | O (5/5) |
| 9 | 11 | X(2/5) | X(not assembled) |
| 10 | 14 | X(0/5) | X(not assembled) | ns that
THRUST ROLLER BEARING

TECHNICAL FIELD

The present invention relates to thrust roller bearings that are used, for example, in various types of transmissions of motor vehicles.

BACKGROUND ART

As an example of a conventional thrust roller bearing, there is known a thrust roller bearing in which a sum of both inside diameter and outer diameter side in-bearing gaps between both inner and outer side surfaces of a cage and an outer circumferential surface of an inner flange and an inner circumferential surface of an outer flange is made to be such as to absorb an eccentricity between a member which supports an outer ring and a member with which an inner ring is brought into abutment, and an inner locking portion and an outer locking portion are provided on distal edge portions of the inner flange and the outer flange, respectively (for example, refer to Patent Document No. 1).

As another example of a conventional thrust roller bearing, there is known a thrust roller bearing in which a cylindrical guide portion is formed integrally on an outer circumferential edge portion of a thrust race portion, and holding tabs are provided in a plurality of locations on a distal end portion of this guide portion (for example, refer to Patent Document No. 2).

As a further example of a conventional thrust roller bearing, there is known a thrust roller bearing in which a plurality of claws are formed on a distal end portion of a flange of an outer ring in such a manner as to be bent at right angles so as to project inwards to lock an outer circumferential edge of a cage, and a projecting amount of each claw is made larger than a bearing interior gap in a radial direction (for example, refer to Patent Document No. 3).

Patent Document No. 1: JP-A-2000-266043 (pages 5 to 6, FIG. 1)
Patent Document No. 2: JP-A-2003-049844 (pages 2 to 3, FIG. 2)
Patent Document No. 3: JP-A-2003-083339 (pages 3 to 4, FIG. 1)

DISCLOSURE OF THE INVENTION

Problem that the Invention is to Solve

In Patent Documents Nos. 1, 2 and 3 that are described above, however, when the bore exceeds $\phi 50$ (mm), the amount of deformation becomes large due to heat treatment on the flange portions of the race portions and the inside and outside diameters of the cage, and as a result, separation between the race portions and the cage tends to be facilitated.

The invention has been made in view of the situations described above, and an object thereof is to provide a thrust roller bearing which can increase the durability of a cage even when the amount of eccentricity between a member which supports an outer ring and a member which supports an inner ring is large, increase the assembling properties and prevent the separation between race portions and the cage.

Means for Solving the Problem

According to a first aspect of the invention, there is provided a thrust roller bearing including:

a plurality of rollers which are arranged in a radial direction;

a cage which is made into a circular ring shape as a whole for rotatably holding the plurality of rollers;

an outer ring including a circular ring shaped outer ring race portion and a cylindrical outer flange which is formed along the full circumference of an outer circumferential edge of the outer ring race portion; and an inner ring including a circular ring shaped inner ring race portion and an inner flange which is formed along the full circumference of an inner circumferential edge of the inner ring race portion, wherein the plurality of rollers are held between the outer ring race portion and the inner ring race portion, the outer ring and the inner ring are assembled to a pair of members which rotate relatively to each other, in a state that the outer ring, the inner ring and the cage are disposed concentrically with one another, an outer diameter side in-bearing gap is provided between an outer circumferential surface of the cage and an inner circumferential surface of the outer flange, and an inner diameter side in-bearing gap is provided between an inner circumferential surface of the cage and an outer circumferential surface of the inner flange, one half of a total gap which results from adding up the outer diameter side in-bearing gap and the inner diameter side in-bearing gap in a diametrical direction is made larger than an amount of eccentricity between a member which supports the outer ring and a member which supports the inner ring, an outer locking portion and an inner locking portion are provided on distal edge portions of the outer flange and the inner flange, respectively, at least one of the outer locking portion and the inner locking portion is formed by bending, and when letting an inside diameter at a distal end of the outer locking portion be $\phi D1$, an outside diameter of the cage be $\phi D2$, an outside diameter at a distal end of the inner locking portion be $\phi D3$, an inside diameter of the cage be $\phi D4$ and a thickness of the cage be t, values of A and B are defined as $A=(D2-D1)/t$, $B=(D3-D4)/t$ and values A and B are set to fall within ranges of $0.1 \leq A$, $B \leq 5$.

According to a second aspect of the invention, as set forth in the first aspect of the invention, there is provided a thrust roller bearing, the outer locking portion is bent diametrically inwards along the full circumference of the outer flange at a distal edge portion thereof.

According to a third aspect of the invention, as set forth in the first aspect of the invention, there is provided a thrust roller bearing, wherein the outer locking portion is bent diametrically inwards in a plurality of circumferential locations at a distal edge portion of the outer flange.

According to a fourth aspect of the invention, as set forth in the second or third aspect of the invention, there is provided a thrust roller bearing, wherein the inner locking portion is a staking tab.

According to a fifth aspect of the invention, as set forth in any one of the first to fourth aspects of the invention, there is provided a thrust roller bearing, wherein the bore is larger than 50 mm.

Advantage of the Invention

According to the thrust roller bearing of the invention, at least one of the outer locking portion and the inner locking portion is made by bending, one half of the total gap which results from adding up the outer diameter side in-bearing gap and the inner diameter side in-bearing gap in the diametrical direction is made larger than the amount of eccentricity between the member which supports the outer ring and the member which supports the inner ring, and letting the inside diameter at the distal end of the outer locking portion be φD1, the outside diameter of the cage be φD2, the outside diameter at the distal end of the inner locking portion be φD3, the inside diameter of the cage be φD4 and the thickness of the cage be t, the values of A, B in A=(D2−D1)/t, B=(D3−D4)/t fall within ranges of 0.1≦A, B≦5, whereby the problem that the separation between the race portions and the cage is facilitated can be solved. Due to this, even when the amount of eccentricity between the member which supports the outer ring and the member which supports the inner ring is large, the durability of the cage cab be increased and also the assembling properties can be increased. Therefore, it becomes possible to obtain an advantage that the separation between the race portions and the cage is prevented.

BRIEF DESCRIPTION OF THE DRAWINGS

FIG. 5 is a table of results of tests carried out to investigate relationships between amounts of eccentricity of respective members and damages to the bearing and a cage;

FIG. 6 is a table of results of tests carried out to investigate relationships between a value A and the strength of the cage and the separation difficulty of the cage;

FIG. 7 is a table of results of tests carried out to investigate relationships between a value B and the strength of the cage and the separation difficulty of the cage;

Figure 1:
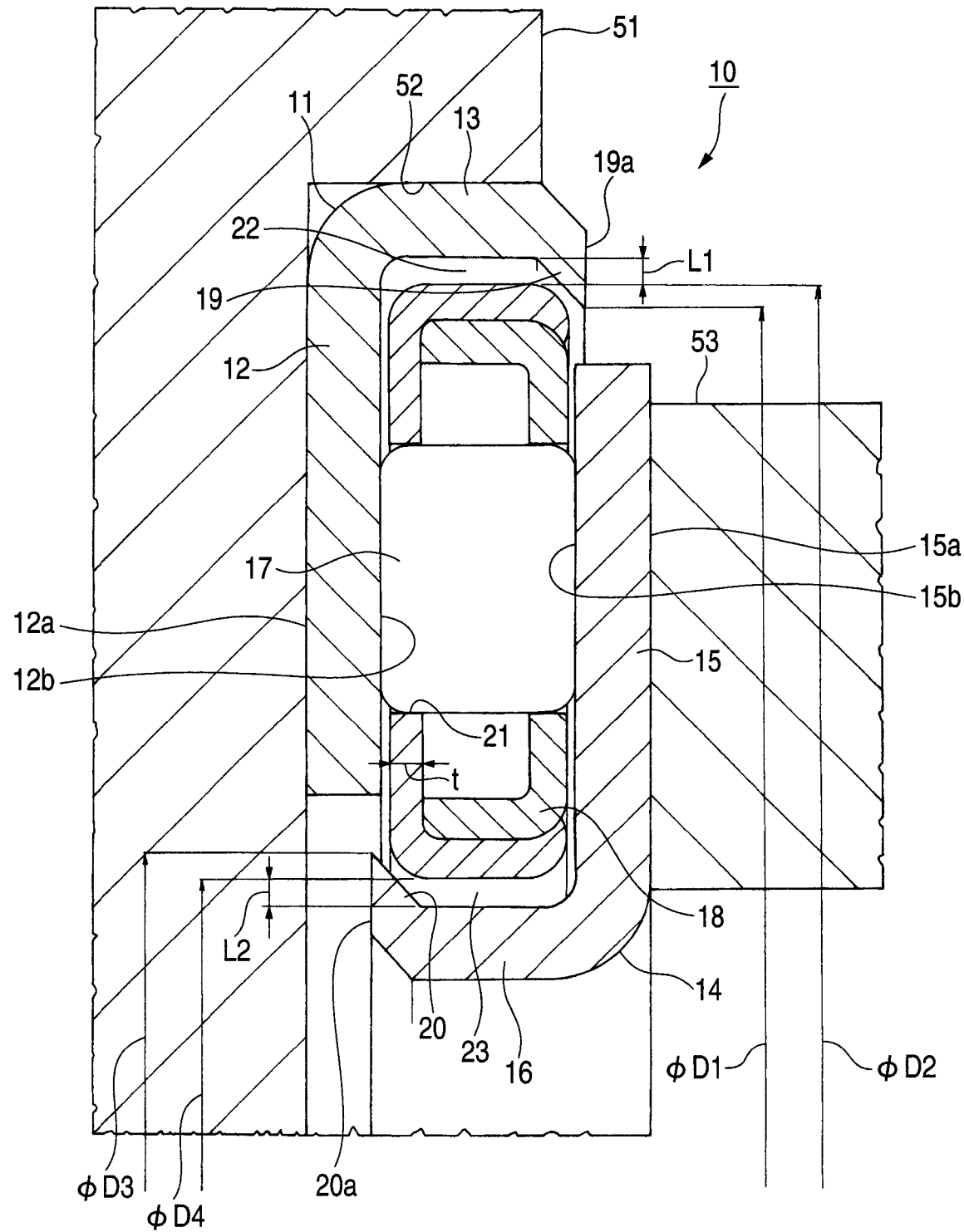
FIG. 1 is a half sectional view of a first application example which shows an embodiment of a thrust roller bearing according to the invention.

DESCRIPTION OF REFERENCE NUMERALS 10 thrust roller bearing
11 outer ring (raceway ring)
12 outer ring race portion
13 outer flange
14 inner ring
15 inner ring race portion
16 inner flange
17 roller
18, 18A cage
19 outer locking portion
20, 60 inner locking portion
22 outer diameter side in-bearing gap
23 inner diameter side in-bearing gap
51 casing (member)
53 mating member (member)
54 shaft (member)

BEST MODE FOR CARRYING OUT THE INVENTION

Hereinafter, a preferred embodiment according to the invention will be described in detail based on drawings.

Figure 2:
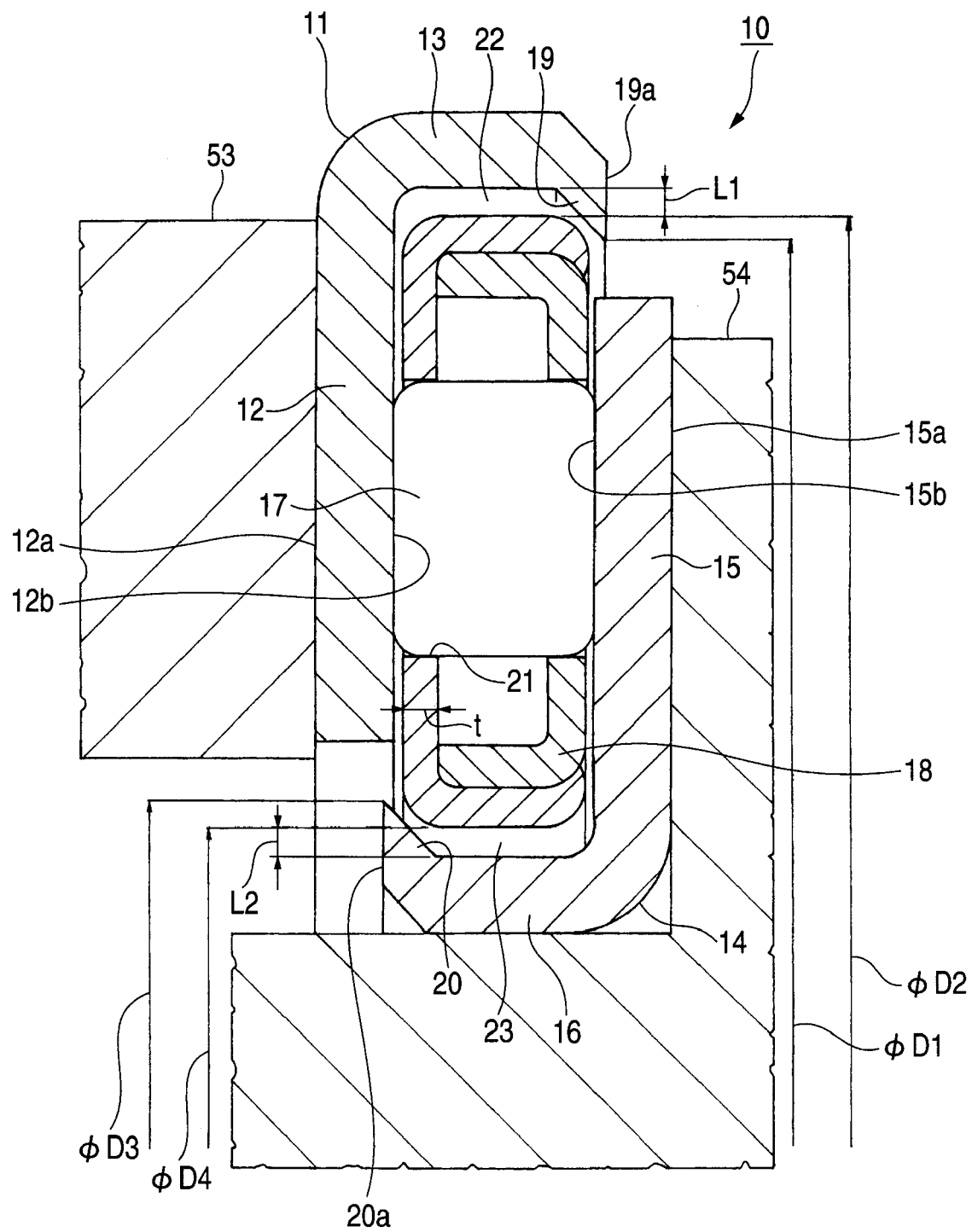
FIG. 2 is a half sectional view of a second application example in the thrust roller bearing shown in FIG. 1.
Figure 3:
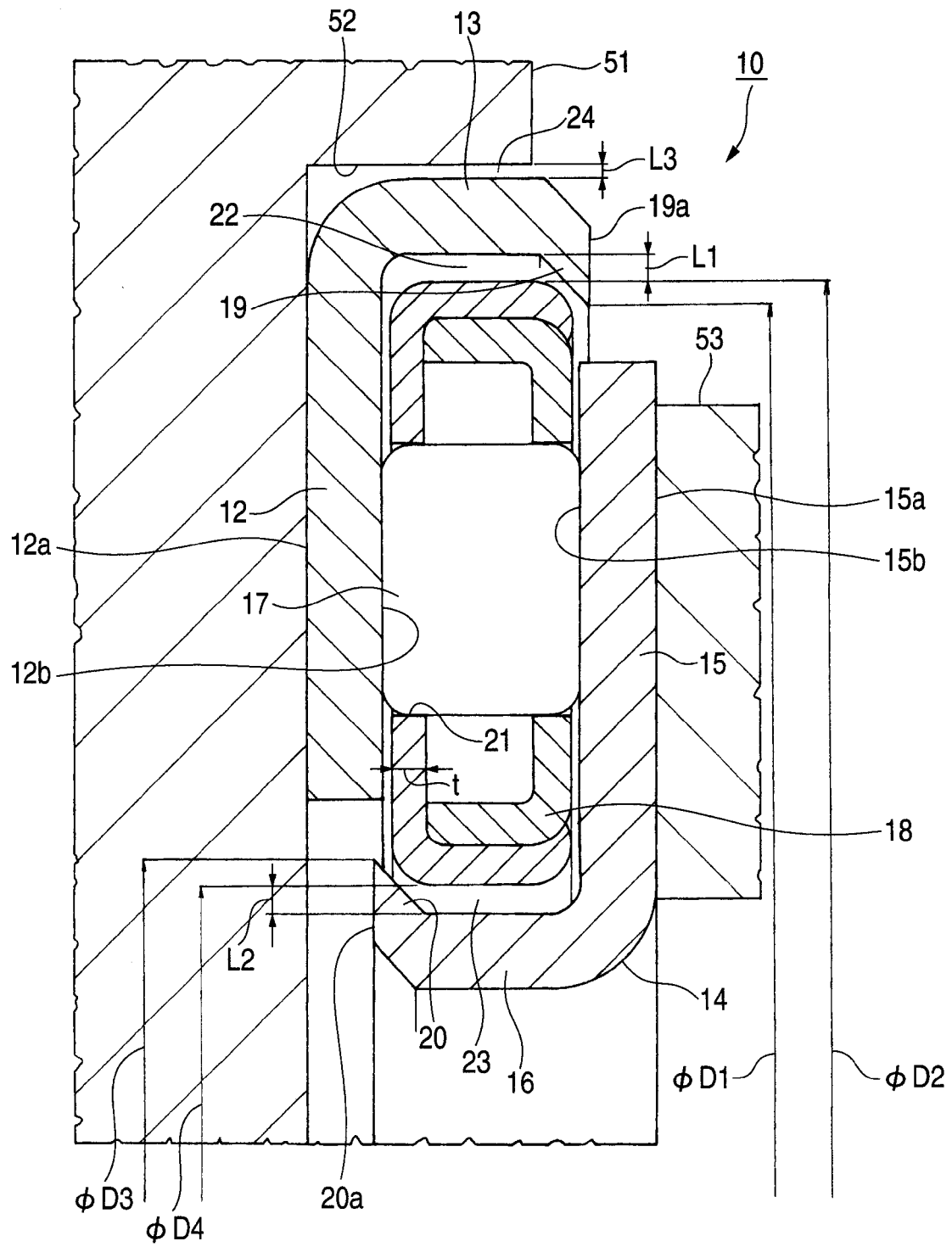
FIG. 3 is a half sectional view of a third application example in the thrust roller bearing shown in FIG. 1.
Figure 4:
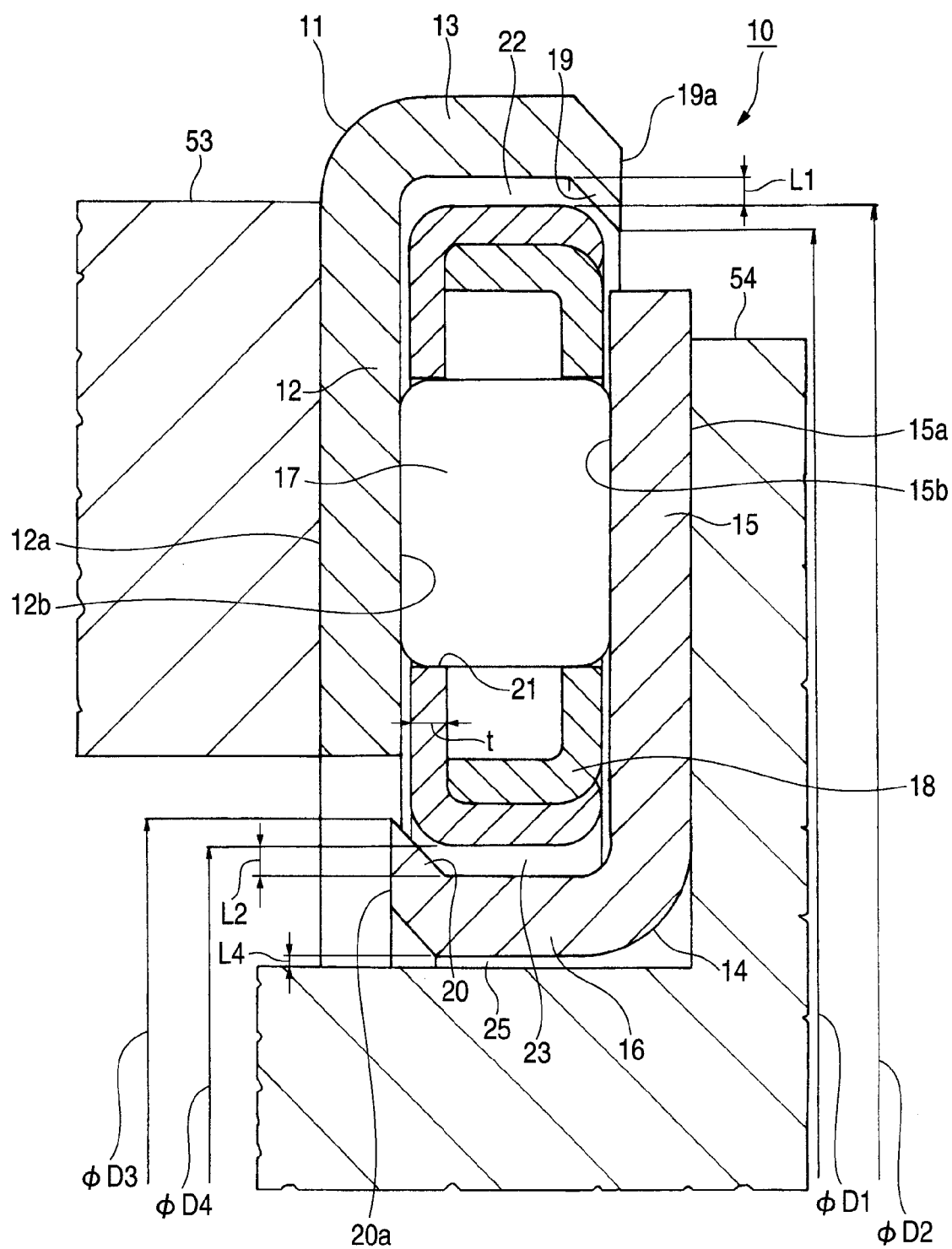
FIG. 4 is a half sectional view of a fourth application example in the thrust roller bearing shown in FIG. 1.

FIG. 1 is a halt sectional view of a first application example which shows an embodiment of a thrust roller bearing according to the invention, FIG. 2 is a half sectional view of a second application example in the thrust roller bearing shown in FIG. 1, FIG. 3 is a half sectional view of a third application example in the thrust roller bearing shown in FIG. 1, and FIG. 4 is a half sectional view of a fourth application example in the thrust roller bearing shown in FIG. 1.

As is shown in FIG. 1, a thrust roller bearing 10, which is an embodiment of the invention, is made up of an outer ring 11, which has an outer ring race portion 12 and an outer flange 13, an inner ring 14, which has an inner ring race portion 15 and an inner flange 16, a plurality of rollers 17 which are arranged in a radial direction, and a cage 18 which holds the plurality of rollers 17 in such a manner as to roll freely.

The outer ring 11 is formed into a circular ring shape of a metallic plate having a sufficient hardness, and the outer flange 13 is formed into a cylindrical shape along the full circumference of an outer edge of the outer ring race portion 12. In addition, the outer ring 11 has an outer locking portion 19 which is bent obliquely diametrically inwards along the full circumference of a distal edge of the outer flange 13. The outer locking portion 19 may be formed in a plurality of circumferential locations of the outer flange 13.

The inner ring 14 is formed into a circular ring shape of a metallic plate having a sufficient strength in a similar manner to that in which the outer ring 11 is formed, and the inner flange 16 is formed into a cylindrical shape along the full circumference of an inner circumferential edge of the inner race portion 15 which is formed into a circular ring shape. In addition, the inner ring 14 has an inner locking portion 20 which is bent obliquely diametrically outwards along the full circumference of a distal edge of the inner flange 16. The inner locking portion 20 may be formed in a plurality of circumferential locations of the inner flange 16.

An axial end face 19a of the outer locking portion is positioned further inside than a back surface 15a of the inner ring race portion 15 with which a mating member 53, which will be described later, is brought into abutment (that is, between a race surface 15b and the back surface 15a), and also an axial end face 20a of the inner locking portion 20 is positioned further inside than a back surface 12a of the outer ring portion 12 with which a casing 51, which will be described later, is brought into abutment (that is between a race surface 12b and the back surface 12a).

The cage 18 is made up by combining together metallic plates, which are each formed into a circular ring shape as a whole and has a U-shaped cross section, in the way like monaka. Monaka is a Japanese bean-jam-filled wafer which is made up by sandwiching the bean-jam by two flanged wafers so as to totally surround the bean-jam. The cage 18 has the same number of pockets 21 as that of the rollers 17, which are arranged in a radial direction. The cage 18 is brought into engagement with the outer locking portion 19 of the outer flange 12 along an outer circumferential edge thereof and is brought into engagement with the inner locking portion 20 of the inner flange 16 along an outer circumferential edge thereof, whereby the separation of the cage 18 from the outer ring 11 and the inner ring 14 is attempted to be prevented.

In the thrust roller bearing 10, an outer diameter side in-bearing gap 22 is provided over a radial direction between an outer circumferential surface of the cage 18 and an inner circumferential surface of the outer flange 13, and an inner diameter side in-bearing gap 23 is provided over a radial direction between an inner circumferential surface of the cage 18 and an outer circumferential surface of the inner flange 16. These outer diameter side in-bearing gap 22 and inner diameter side in-bearing gap 23 have width dimensions L1, L2, respectively, in such a state that the outer ring 11, the inner ring 14 and the cage 18 are disposed concentrically with one another. In addition, these width dimensions L1, L2 are substantially equal to each other (L1≈L2, a deviation therebetween is within a production tolerance, which is, for example, equal to or less than 20%).

In addition, values of A, B in A=(D2−D1)/t, B=(D3−D4)/t when letting an inside diameter at a distal end of the outer locking portion 19 be φD1, an outside diameter of the cage 18 be φD2, an outside diameter at a distal end of the inner locking portion 20 be φD3, an inside diameter of the cage 18 be φD4 and the thickness of the cage be t are set to fall within ranges of 0.1≦A, B≦5. Note that in this embodiment, the thickness t is used which ranges from 0.3 to 0.8 mm.

In this application example, the thrust roller bearing 10 that is configured as has been described above is fitted without loosening in a supporting recessed portion 52 provided in the casing 51, and the inner ring 14 is assembled in such a state that the inner ring 14 is in abutment with an end face of the mating member 53, whereby the relative rotation between both the casing 51 and the mating member 53 is made free to occur while supporting a thrust load applied between both the members 51, 53. In particular, the thrust roller bearing 10 of this embodiment, ½·(=L1+L2) of a total gap (=2L1+2L2) which results from adding up the width dimension L1 of the outer diameter side in-bearing gap 22 and the width dimension L2 of the inner diameter side in-bearing gap 23 in the diametrical direction is made larger than the amount of eccentricity δ (a distance between the rotational center of the casing 51 and the rotational center of the mating member 53) between the casing 51 and the mating member 53 {(L1+L2)>δ}.

According to the thrust roller bearing 10 that has been described heretofore, since one half of the total gap which results from adding up the outer diameter side in-bearing gap 22 and the inner diameter side in-bearing gap 23 in the diametrical direction is made larger than the amount of eccentricity δ between the member which supports the outer ring 11 and the member which supports the inner ring 14, the amount of eccentricity δ is absorbed effectively, so that no undue force is applied to respective portions of the thrust roller bearing 10, thereby making it possible to increase the durability thereof.

In particular, since the outer diameter side in-bearing gap 22 and the inner diameter side in-bearing gap 23, which have the width dimensions L1, L2 which are substantially equal to each other, are disposed on the outside diameter side and the inside diameter of the cage 18, the eccentricity existing between the casing 51 and the mating member 53 can be absorbed without using extra parts while realizing the prevention of separation between the cage 18 and the outer ring 11 and the inner ring 14. Accordingly, the sum of both the width dimensions L1, L2 is made sufficiently large even in the event that the width dimension L1 of the outer diameter side in-bearing gap 22 and the width dimension L2 of the inner diameter side in-bearing gap 23 are not made extraordinarily large, so as to absorb the amount of eccentricity δ effectively. As a result, the application of undue force to the respective portions of the thrust roller bearing 10 is prevented. Therefore, it becomes possible to realize an increase in the durability thereof.

In addition, when letting the inside diameter at the distal end of the outer locking portion 19 that is provided along the distal edge portion of the outer flange 13 be φD1, the outside diameter of the cage 18 be φD2, the outside diameter at the distal end of the inner locking portion 20 that is provided along the distal edge portion of the inner flange 16 be φD3, the inside diameter of the cage 18 be φD4 and the thickness of the cage be t, the values of A, B in A=(D2−D1)/t, B=(D3−D4)/t reside within the ranges of 0.1≦A, B≦5, whereby when assembling together the outer ring 11 and the inner ring 14 in such a state that a radial displacement of the casing 51 and the mating member 53, which rotate relatively to each other, is prevented, the durability of the cage 18 can be increased and also the assembling properties can be increased, thereby making it possible to prevent the separation between the inner and outer ring race portions 12, and the cage 18.

In addition, while in this application example, the outer diameter side in-bearing gap 22 and the inner diameter side in-bearing gap 23, which have the width dimensions L1, L2 which are substantially equal to each other, are disposed on the outside diameter side and the inside diameter of the cage 18, both the width dimensions L1, L2 of the outer diameter side in-bearing gap 22 and the inner diameter side in-bearing gap 23 may be set to dimension ratios such as L1:L2=3:7, 4:6, 6:4, 7:3 and the like.

As is shown in FIG. 2, in a second application example in which a thrust roller bearing 10 is used which has the same construction as that of the first application example, an inner ring 14 is fitted on a shaft 54 without loosening, and an outer ring 11 is brought into abutment with a mating member 53. In addition, when letting an inside diameter at a distal end of an outer locking portion 19 be φD1, an outside diameter of a cage 18 be φD2, an outside diameter at a distal end of an inner locking portion 20 be φD3, an inside diameter of the cage 18 be φD4 and the thickness of the cage 18 be t, values of A, B in A=(D2−D1)/t, B=(D3−D4)/t are set to fall within ranges of 0.1≦A, B≦5. Since this second application example provides a similar function and advantage to those provided by the first application example, the description thereof will be omitted.

As is shown in FIG. 3, in a third application example using a thrust roller bearing 10 having the same construction as those of the first and second application examples, an outer ring 11 is loosely fitted in a supporting recessed portion 52 on a casing 51. In addition, similar to the first and second application examples, an outer diameter side in-bearing gap 22 and a inner diameter side in-beating gap 23 are provided in such a state that the casing 51, the outer ring 11, an inner ring 14 and a cage 18 are disposed concentrically with one another. Furthermore, an assembling gap 24 having a width dimension of L3 is provided between an outer circumferential surface of an outer flange 13 of the outer ring 11 and an inner surface of the supporting recessed portion 52. Then, when letting an inside diameter at a distal end of an outer locking portion 19 be φD1, an outside diameter of the cage 18 be φD2, an outside diameter at a distal end of an inner locking portion 20 be φD3, an inside diameter of the cage 18 be φD4 and the thickness of the cage 18 be t, values of A, B in A=(D2−D1)/t, B=(D3−D4)/t are set to fall within ranges of 0.1≦A, B≦5.

According to the thrust roller bearing 10 of the third application example, one half of the total gap which results from adding up the outer diameter side in-bearing gap 22 and the inner diameter side in-bearing gap 23 in the diametrical direction is made larger than the amount of eccentricity δ between the casing 51 which supports the outer ring 11 and a mating member 53 which supports the inner ring 14, and when letting the inside diameter at the distal end of the outer locking portion 19 be φD1, the outside diameter of the cage 18 be φD2, the outside diameter at the distal end of the inner locking portion 20 be φD3, the inside diameter of the cage 18 be φD4 and the thickness of the cage 18 be t, the values of A, B in A=(D2−D1)/t, B=(D3−D4)/t reside within ranges of 0.1≦A, B≦5.

According to this configuration, when the outer or inner flange 13, 16 which is formed on a circumferential edge of at least one raceway ring of the outer ring 11 and the inner ring 14 is fitted loosely in the casing 51 in which a raceway ring is to be assembled, even in the event that the amount of eccentricity between the casing 51 which supports the outer ring 11 and the mating member 53 which supports the inner ring 14 is large, the durability of the cage 18 can be increased. In addition, the assembling properties can also be increased, and the separation between the outer ring and inner ring race portions 12, 15 and the cage 18 can be prevented. In particular, in the case of this application example, a larger amount of eccentricity δ can be absorbed while ensuring further the prevention of separation between the cage 18 and the outer ring 11 and the inner ring 14 by making smaller the width dimensions L1, L2 of the outer diameter side in-bearing gap 22 and the inner diameter side in-bearing gap 23 than those of the first application example and the second application example.

As is shown in FIG. 4, in a fourth application example using a thrust roller bearing 10 having the same construction as those of the first, second and third application examples, an inner ring 14 is loosely fitted on a shaft 54, an outer ring 11 is brought into abutment with a mating member 53, and an assembling gap 25 having a width dimension of L4 is provided between an inner circumferential surface of an inner flange 16 and an outer circumferential surface of the shaft 54. In addition, when letting an inside diameter at a distal end of an outer locking portion 19 be φD1, an outside diameter of a cage 18 be φD2, an outside diameter at a distal end of an inner locking portion 20 be φD3, an inside diameter of the cage 18 be φD4 and the thickness of the cage 18 be t, values of A, B in A=(D2−D1)/t, B=(D3−D4)/t are set to fall within ranges of 0.1≦A, B≦5. Since this fourth application example provides a similar function and advantage to those provided by the first application example, the description thereof will be omitted.

EXAMPLE

Next, referring to FIGS. 5 to 8, an example will be described which was carried out in order to verify the function and advantage of the thrust roller bearing 10 according to the invention.

Figure 8:
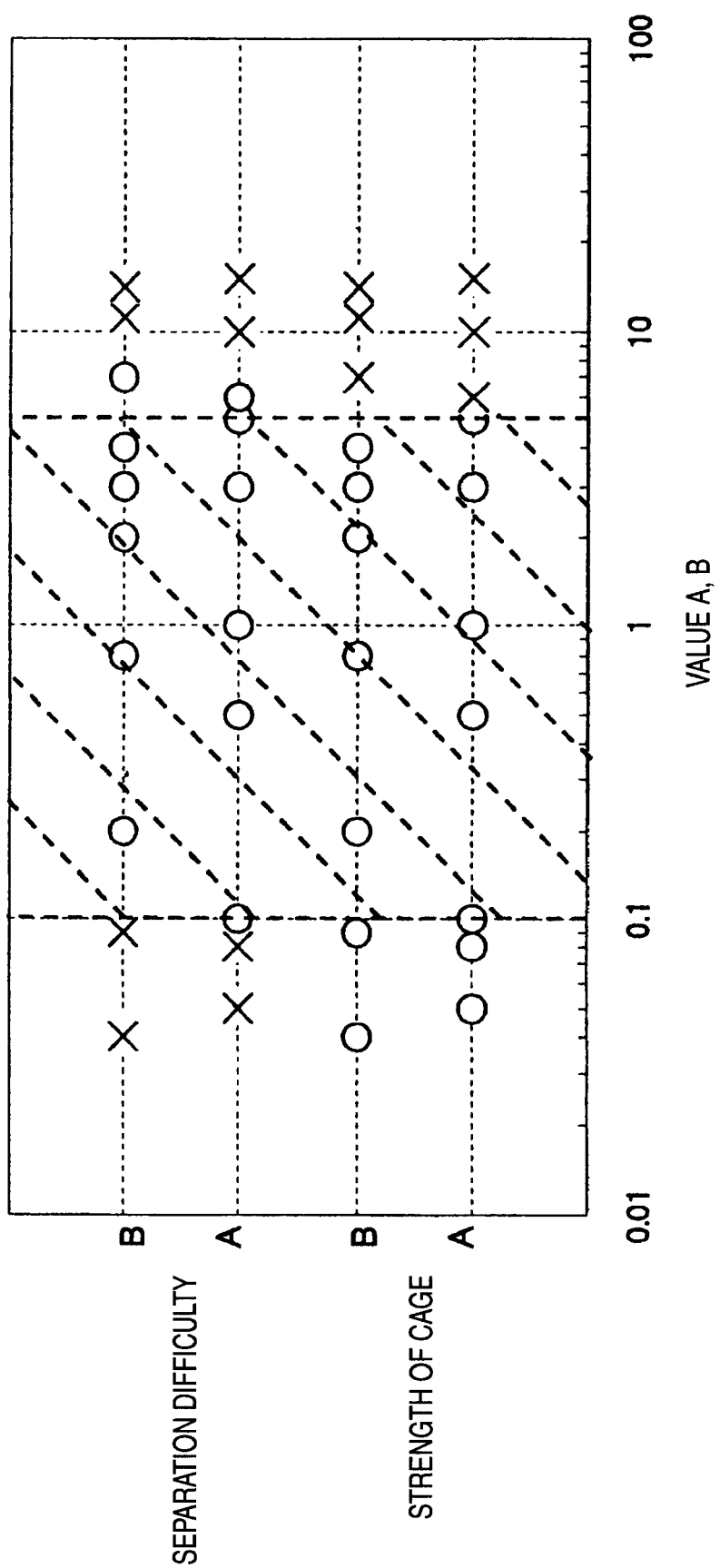
FIG. 8 is a distribution chart which shows results of investigations on relationships between the values A, B and the strength of the cage and the separation difficulty of the cage.

FIG. 5 is a table showing results of tests carried out to investigate relationships between amounts of eccentricity of respective members and damages to a bearing and a cage, FIG. 6 is a table showing results of tests carried out to investigate relationships between the value A and the strength of the cage and the separation difficulty of the cage, FIG. 7 is a table showing results of tests carried out to investigate relationships the value b and the strength of the cage and the separation difficulty of the cage, and FIG. 8 is a distribution chart showing results of investigations on relationships between the values A, B and the strength of the cage and the separation difficulty of the cage.

As is shown in FIG. 5, firstly, in order to investigate relationships between amounts of eccentricity of respective members such as the casing 51, the mating member 53 and the shaft 54 and damage to the thrust roller bearing 10 and the cage 18, members (1), (2), (3), (4), (5), (6) were prepared which had six different amounts of eccentricity. Then, tests were carried out in which members in accordance with a conventional specification in which the values of A, B in A=(D2−D1)/t, B=(D3−D4)/t are A=1.5, B=1.5 and staking tabs are used for both an inner locking portion and an outer locking portion was compared with members in accordance with the specification of the invention in which the values of A, B are A=0.75, B=1.0 which fall within the ranges of 0.1≦A, B≦5 according to the invention.

(Test Conditions)

Bearing Size: inside diameter φ70×outside diameter 100× width 5

Load: 0.5Ca (Ca: dynamic rated load [N])

Revolution Speed of Bearing: 5000 rpm

Total Gap of Bearing: conventional Specification 0.6 mm/specification of Invention 1.2 mm Determination Criteria No damage made to the bearing in 30 hours As a result of the tests, in the conventional specification in which the values of A, B in A=(D2−D1)/t, B (D3−D4)/t are not in the ranges of 0.1≦A, B≦5, with the test numbers (1), (2), (3) whose amounts of eccentricity were 0.1, 0.2, 0.3, respectively, while no damage happened to the bearings even after 100 hours or more had elapsed, with the test number (4) whose amount of eccentricity was 0.4, a damage was caused to the bearing when 25 hours had elapsed, with the test number (5) whose amount of eccentricity was 0.5, a damage was caused to the bearing when 15 hours had elapsed, and with the test number (6) whose amount of eccentricity was 0.6, a damage was caused to the bearing after 5 hours had elapsed.

In contrast to this, in the specification of the invention in which the values of A, B in A=(D2−D1)/t, B=(D3−D4)/t are in the ranges of 0.1≦A, B≦5, with any of the test numbers (1), (2), (3), (4), (5), (6) whose amounts of eccentricity were 0.1, 0.2, 0.3, 0.4, 0.5 and 0.6, respectively, no damage happened to the bearings even after 100 hours or more had elapsed. It is seen that this is because the values of A, B in A=(D2−D1)/t, B=(D3−D4)/t fall within the ranges of 0.1≦A, B≦5 with the inside diameter at the distal end of the outer locking portion 19 be φD1, the outside diameter of the cage 18 be φD2, the outside diameter at the distal end of the inner locking portion 20 be φD3, the inside diameter of the cage 18 be φD4 and the thickness of the cage 18 be t.

Next, as is shown in FIG. 6, tests were carried out to investigate a relationship between the value A in A=(D2−D1)/t and the strength of the cage and the separation difficulty of the cage. In the tests, five thrust bearings were prepared for each of ten different values of A embodied in (1), (2), (3), (4), (5), (6), (7), (8), (9), (10), and cage strength tests to investigate the number of occurrences of chipping in the five samples (N=5) and separation difficulty tests to investigate the number of occurrences of cage separation in the five samples (N=5) were carried out under the same test conditions as those used in the tests in FIG. 5.

As a result of the cage strength tests, with the bearings (1), (2), (3), (4), (5), (6) and (7) whose value A were 0.05, 0.08, 0.1, 0.5, 1.0, 3.0 and 5.0, respectively, no chipping was caused in five samples out of five samples (no chipping in 5/5). However, it was verified that with the bearing (8) whose value A was 6.0, chipping was generated in one sample out of five samples (no chipping in 4/5), with the bearing (9) whose value A was 10.0, chipping was generated in three samples out of five samples (no chipping in 2/5), and with the bearing (10) whose value A was 15.0, chipping was generated in five samples out of five samples (no chipping in 0/5).

As a result of the separation difficulty tests, with the bearing (1) whose value A was 0.05, separation happened in four samples out of five samples (no separation in 1/5), and with the bearing (2) whose value A was 0.08, separation was generated in one sample of five samples (no separation in 4/5). However, with the bearings (3), (4), (5), (6), (7) and (8) whose values A was 0.1, 0.5, 1.0, 3.0, 5.0 and 6.0, respectively, separation was not generated in five samples out of five samples (no separation in 5/5). Further, with the bearing (9) whose value A was 10.0 and with the bearing (10) whose value A was 15.0, separation was generated in all samples and those bearings could not be assembled.

Next, as is shown in FIG. 7, tests were carried out to investigate a relationship between the value B in B=(D3−D4)/t and the strength of the cage and the separation difficulty of the cage. In the tests, five thrust bearings were prepared for each of 10 different values of B embodied in (1), (2), (3), (4), (5), (6), (7), (8), (9) and (10), and cage strength tests to investigate the number of occurrences of chipping in the five samples (N=5) and separation difficulty tests to investigate the number of occurrences of cage separation in the five samples (N=5) were carried out under the same test conditions as those used in the tests in FIG. 5.

As a result of the cage strength tests, with the bearings (1), (2), (3), (4), (5), (6) and (7) whose value B were 0.04, 0.09, 0.2, 0.8, 2.0, 3.0 and 4.0, respectively, no chipping was caused in five samples out of five samples (no chipping in 5/5). However, it was verified that with the bearing (8) whose value B was 7.0, chipping was generated in two sample out of five samples (no chipping in 3/5), with the bearing (9) whose value B was 11.0, chipping was generated in three samples out of five samples (no chipping in 2/5), and with the bearing (10) whose value B was 14.0, chipping was generated in five samples out of five samples (no chipping in 0/5).

As a result of the separation difficulty tests, with the bearing (1) whose value B was 0.04, separation happened in five samples out of five samples (no separation in 0/5), and with the bearing (2) whose value B was 0.09, separation was generated in one sample of five samples (no separation in 4/5). However, with the bearings (3), (4), (5), (6), (7) and (8) whose values B was 0.2, 0.8, 2.0, 3.0, 4.0 and 7.0, respectively, separation was not generated in five samples out of five samples (no separation in 5/5). Then, with the bearing (9) whose value A was 11.0 and with the bearing (10) whose value B was 14.0, separation was generated in all samples and those bearings could not be assembled.

Next, as is shown in FIG. 8, the relationships between the values A, B and the cage strength and the cage separation difficulty are shown into a distribution chart with "O" indicating that the cage strength is good and that the cage separation difficulty is good and "X" indicating that the cage strength is not good and that the cage separation difficulty is not good, and it is seen from the distribution chart that with the values A, B being smaller than 0.1, the separation of the cage from the respective race portions is facilitated, and with the values A, B being larger than 5.0, chipping is generated in the cage when attempting to assemble together the cage and the respective race portions, and this makes such an assembly impossible.

It is seen from this fact that by setting the values A, B in A=(D2−D1)/t, B=(D3−D4)/t to fall within the ranges of $0.1 \leq A, B \leq 5$, even in the event that the amount of eccentricity between the member which supports the outer ring and the member which supports the inner ring is large, the durability of the cage can be increased and also the assembling properties can be increased, whereby the separation between the race portions and the cage can be prevented.

Note that the invention is not limited to the embodiment but can be modified or improved variously. For example, the invention may be applied even to a needle roller bearing.

While in the embodiment, the outer locking portion 19 is bent diametrically inwards along the full circumference of the distal edge portion of the outer flange and the inner locking portion 20 is bent diametrically outwards along the full circumference of the distal edge portion of the inner flange 16, it may be acceptable that either of the outer locking portion 10 and the inner locking portion 20 is bent. Namely, the other of the outer locking portion 19 and the inner locking portion 20 may be formed in a plurality of circumferential locations by extruding using the staking tab type or the like.

Figure 9:
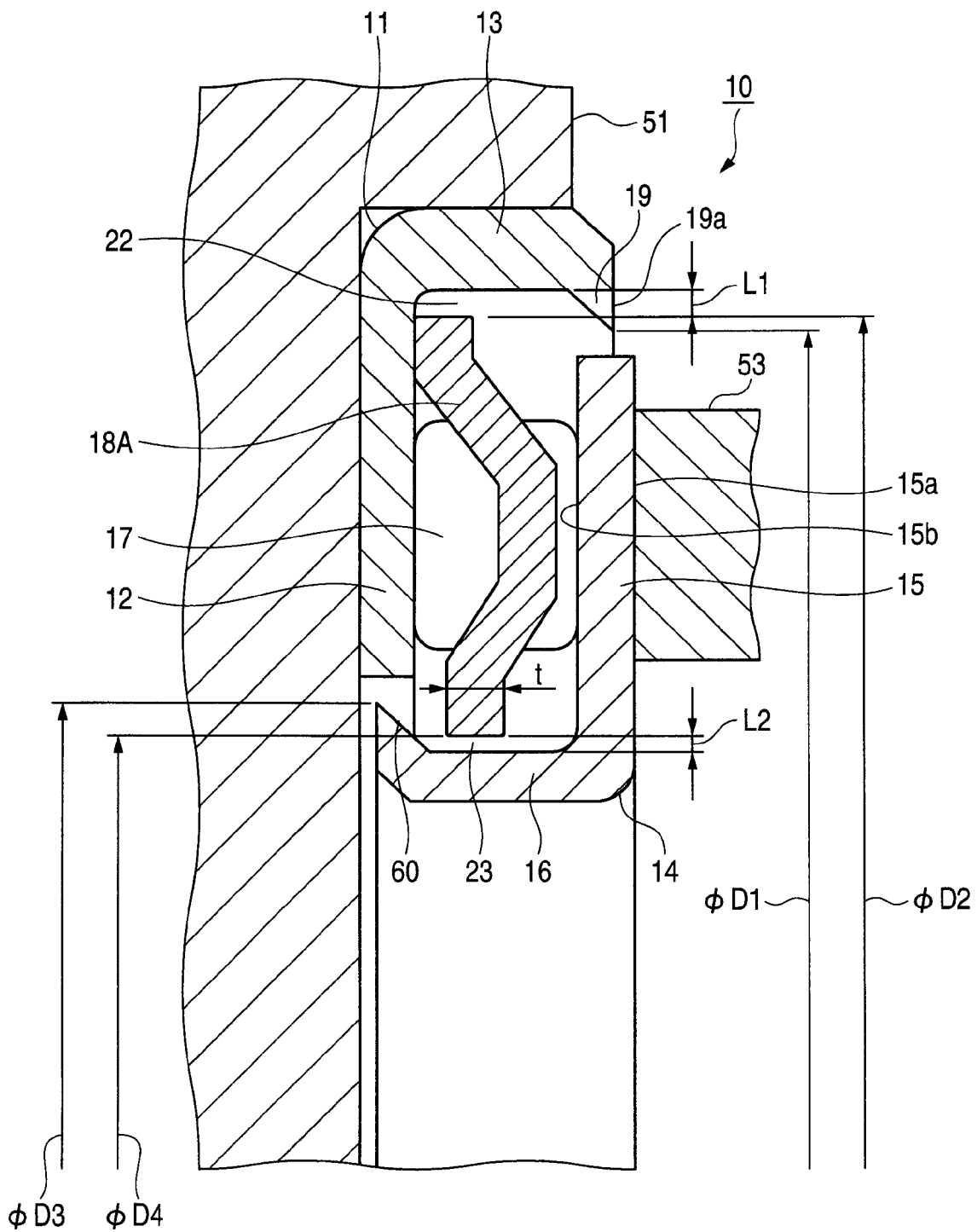
FIG. 9 is a half sectional view showing a modified example to the thrust roller bearing according the invention.

In a thrust roller bearing of a modified example shown in FIG. 9, an outer locking portion 19 is bent along the full circumference of a distal edge portion of an outer flange 13, while inner locking portions 60 are formed in a plurality of circumferential locations on a distal edge portion of an inner flange portion 16 using the staking tab type. Here, the staking tab type means the member formed by extrusion. In addition, in bending, when considering the properties of the material, it is preferable to bend the material towards the outside diameter side, and the occurrence of failure is made difficult by such bending.

In addition, as with the application examples that have been described above, an axial end surface 19a of the outer locking portion 19 is positioned further inside than a back surface 15a of an inner race portion 15 which is brought into abutment with a mating member 53 (namely, between a race surface 15b and the back surface 15a).

The amount of projection of the outer locking portion 19 which is formed by being bent along the full circumference thereof is made to be on the order of 0.5 mm, for example, while the amount of projection of the inner locking portions 60 which are formed in the plurality of circumferential locations by extrusion (the staking tab type) is made to be on the order of 0.4 mm, so as to become smaller than the projection amount of the outer locking portion 19. However, it is possible to make the projection amount of the inner locking portions 60 utilizing the staking tab type to be larger than the projection amount of the outer locking portion 19.

In addition, while the width dimension L1 of the outer diameter side in-bearing gap 22 which is formed by causing the locking portion to be bent along the full circumference thereof is set to be larger than the width dimension L2 of the inner diameter side in-bearing gap 23 (L1>L2), ½·(L1+L2) of the total gap which results from adding up the outer diameter side in-bearing gap 22 and the inner diameter side in-bearing gap 23 in the diametrical direction is made larger than the amount of eccentricity δ between the casing 51 and the mating member 53.

Additionally, the cage of the invention is not limited to the one which is made up by combining the pair of metallic plates together in the way like monaka but may be formed by bending a single metallic plate. As this occurs, too, an outer circumferential edge thereof is brought into engagement with the outer locking portion 19 of an outer flange of an outer ring 12, while an inner circumferential edge thereof is brought into an inner locking portion 20A of a inner flange 16, so as to attempt to realize the prevention of separation thereof. Consequently, even in the event that the thickness of the cage 18A is let to be t, the values of A, B in A=(D2−D1)/t, B=(D3−D4)/t reside in the ranges of $0.1 \leq A, B \leq 5$.

This patent application is based on the Japanese Patent Application (No. 2005-183538) filed on Jun. 23, 2005, and all the contents thereof are incorporated herein by reference.

The invention claimed is:

1. A thrust roller bearing, a bore of the bearing being larger than 50 mm, the thrust roller bearing comprising:
 a plurality of rollers which are arranged in a radial direction;
 a cage which is made into a circular ring shape as a whole for rotatably holding the plurality of rollers, a thickness of the cage being 0.3 mm to 0.8 mm;

an outer ring comprising a circular ring shaped outer ring race portion and a cylindrical outer flange which is formed along the full circumference of an outer circumferential edge of the outer ring race portion; and an inner ring comprising a circular ring shaped inner ring race portion and an inner flange which is formed along the full circumference of an inner circumferential edge of the inner ring race portion, wherein the plurality of rollers are held between the outer ring race portion and the inner ring race portion, the outer ring and the inner ring are assembled to a pair of members which rotate relatively to each other, in a state that the outer ring, the inner ring and the cage are disposed concentrically with one another, an outer diameter side in-bearing gap is provided between an outer circumferential surface of the cage and an inner circumferential surface of the outer flange, and an inner diameter side in-bearing gap is provided between an inner circumferential surface of the cage and an outer circumferential surface of the inner flange, one half of a total gap which results from adding up the outer diameter side in bearing gap and the inner diameter side in-bearing gap in a diametrical direction is made larger than an amount of eccentricity between a member which supports the outer ring and a member which supports the inner ring, an outer locking portion and an inner locking portion are provided on edge portions of the outer flange and the inner flange, respectively, the outer locking portion is bent obliquely and diametrically inwards such that, with respect to an axial direction, an axial end face of the outer locking portion is positioned between a race surface of the inner ring race portion and a back surface of the inner ring race portion, the inner locking portion is bent obliquely and diametrically outwards such that, with respect to the axial direction, an axial end face of the inner locking portion is positioned between a race surface of the outer ring race portion and a back surface of the outer ring race portion, and when letting an inside diameter at a distal end of the outer locking portion be $\phi D1$, an outside diameter of the cage be $\phi D2$, an outside diameter at an end of the inner locking portion be $\phi D3$, an inside diameter of the cage be $\phi D4$ and the thickness of the cage be t, values of A and B are defined as $A=(D2-D1)/t$, $B=(D3-D4)/t$ and the values A and B are set to fall within ranges of $0.1 \leq A \leq 5$, and $0.1 \leq B \leq 5$.

2. The thrust roller bearing as set forth in claim 1, wherein the outer locking portion is bent diametrically inwards along the full circumference of the outer flange at the edge portion thereof.

3. The thrust roller bearing as set forth in claim 2, wherein the inner locking portion is a staking tab.

4. The thrust roller bearing as set forth in claim 3, wherein a width dimension of the outer diameter side in-bearing gap is larger than a width dimension of the inner diameter side in-bearing gap.

5. The thrust roller bearing as set forth in claim 1, wherein a width dimension of the outer diameter side in-bearing gap and a width dimension of the inner diameter side in-bearing gap are substantially equal to each other.

6. The thrust roller bearing as set forth in claim 1, wherein a projection amount of the outer locking portion and a projection amount of the inner locking portion are different from each other.

* * * * *